(12) United States Patent
Logli et al.

(10) Patent No.: US 8,900,349 B2
(45) Date of Patent: Dec. 2, 2014

(54) ABSORBENT COMPOSITION DESIGNED FOR REMOVING CONTAMINANTS, MAINLY SULFUR COMPOUNDS, CONTAINED IN LIQUID AND GASEOUS STREAMS, A METHOD FOR OBTAINING A DESIGNED ABSORBENT COMPOSITION, A METHOD FOR REMOVING IMPURITIES, MAINLY SULFUR COMPOUNDS, INCLUDING HYDROGEN SULFIDE, CONTAINED IN LIQUID OR GASEOUS STREAMS, AND USE OF AN ABSORBENT COMPOSITION

(75) Inventors: Marco Antonio Logli, Avenida Jorge Bei Maluf (BR); Valeria Perfoito Vicentini, Suzano (BR); Marcelo Brito de Azevedo Amaral, São Paulo (BR)

(73) Assignee: Clariant S.A. (BR)

( * ) Notice: Subject to any disclaimer, the term of this patent is extended or adjusted under 35 U.S.C. 154(b) by 120 days.

(21) Appl. No.: 13/819,026

(22) PCT Filed: Jul. 8, 2011

(86) PCT No.: PCT/BR2011/000214
§ 371 (c)(1),
(2), (4) Date: Apr. 4, 2013

(87) PCT Pub. No.: WO2012/024752
PCT Pub. Date: Mar. 1, 2012

(65) Prior Publication Data
US 2013/0216833 A1    Aug. 22, 2013

(30) Foreign Application Priority Data
Aug. 27, 2010    (BR) ..................................... 1002696

(51) Int. Cl.
*B01D 53/48* (2006.01)
*B01J 20/20* (2006.01)
*B01J 20/30* (2006.01)
*B01J 20/28* (2006.01)
*C10K 1/32* (2006.01)
*C10G 25/00* (2006.01)
*B01J 20/06* (2006.01)
*B01D 53/50* (2006.01)

(52) U.S. Cl.
CPC ......... *B01J 20/06* (2013.01); *B01D 2253/1124* (2013.01); *B01D 2257/702* (2013.01); *B01J 20/20* (2013.01); *B01J 2220/42* (2013.01); *B01D 2258/05* (2013.01); *B01D 2253/102* (2013.01); *B01J 2220/56* (2013.01); *B01J 20/3078* (2013.01); *B01J 2220/485* (2013.01); *B01J 20/2803* (2013.01); *C10K 1/32* (2013.01); *C10G 25/003* (2013.01); *B01J 20/3007* (2013.01); *B01J 20/3042* (2013.01); *C10G 2300/202* (2013.01); *B01D 2257/30* (2013.01); *B01D 53/508* (2013.01); *B01J 20/28004* (2013.01); *B01D 2255/20738* (2013.01); *Y10S 95/90* (2013.01)
USPC .................. 95/153; 95/136; 95/900; 96/108; 96/153; 423/231; 208/208 R; 208/244; 264/115; 502/417

(58) Field of Classification Search
USPC .............. 95/135, 136, 900; 96/108, 121, 131, 96/151, 153; 423/230, 231, 244.01; 208/208 R, 244; 585/820; 210/660, 210/502.1; 252/184; 264/115; 502/416, 502/417, 439
See application file for complete search history.

(56) References Cited

U.S. PATENT DOCUMENTS

| 4,732,888 | A  | * | 3/1988  | Jha et al. ........................ | 502/406  |
|-----------|----|---|---------|--------------------------------------|----------|
| 5,670,445 | A  | * | 9/1997  | Kitahara et al. ..............        | 502/406  |
| 5,792,438 | A  | * | 8/1998  | Scranton, Jr. ............             | 423/244.02 |
| 6,833,075 | B2 | * | 12/2004 | Hughes .........................       | 210/679  |
| 7,569,199 | B1 | * | 8/2009  | Barron et al. .................       | 423/231  |
| 7,722,843 | B1 | * | 5/2010  | Srinivasachar ...............         | 423/210  |

FOREIGN PATENT DOCUMENTS

CN         101653690 A    *   2/2010

* cited by examiner

*Primary Examiner* — Frank Lawrence

(57) ABSTRACT

The present invention relates to an absorbent composition composed of an iron oxide and/or hydroxide, activated carbon, promoters and binders, in the form of extruded tablets or granules, capable of absorbing impurities from fluid streams in order to eliminate the impurities, mainly sulfur compounds, contained in these streams. The present invention also relates to the methods for obtaining the absorbents, and to the use thereof for eliminating impurities contained in liquid and gaseous streams.

24 Claims, No Drawings

ABSORBENT COMPOSITION DESIGNED FOR REMOVING CONTAMINANTS, MAINLY SULFUR COMPOUNDS, CONTAINED IN LIQUID AND GASEOUS STREAMS, A METHOD FOR OBTAINING A DESIGNED ABSORBENT COMPOSITION, A METHOD FOR REMOVING IMPURITIES, MAINLY SULFUR COMPOUNDS, INCLUDING HYDROGEN SULFIDE, CONTAINED IN LIQUID OR GASEOUS STREAMS, AND USE OF AN ABSORBENT COMPOSITION

FIELD OF THE INVENTION

The present invention relates to a massive solid absorbent, in the form of tablets or in the form of extrudates, composed of metal oxides and hydroxides and special additives, as well as to the process of manufacture thereof, and the use thereof in the treatment of fluid streams for eliminating impurities contained in such streams. More precisely, the instant invention refers to an absorbent composed of iron oxides and hydroxides, containing additives (promoters and binders), and particularly activated carbon, which has the property of enhancing the capacity of the absorbent to absorb impurities contained in the streams that are treated using the said absorbent, and further improve the physical strength thereof during its preparation and its use.

The streams in which the absorbent that constitutes the object of the present invention is used are typically liquid or gaseous mixtures comprised mainly by hydrocarbons containing impurities constituted by sulfur compounds, typically hydrogen sulfide ($H_2S$) and other compounds such as carbonyl sulfide, organic sulfides and disulfides, thioalcohols, cyclic sulfur compounds, and others. Examples of gaseous streams are natural gas, hydrocarbon gasses associated with the production of petroleum, refinery gasses and the biogas resulting from the decomposition of urban and agricultural wastes. Some examples of liquid streams that may be cited are petroleum naphtha and liquefied petroleum gas (LPG).

BACKGROUND OF THE INVENTION

The presence of sulfur compounds in hydrocarbon streams is undesirable since those compounds may entail various problems associated with the transportation, storage or practical use thereof. Sulfur compounds are corrosive to the piping used to carry those fluids, as well as to the tanks and vessels wherein they are stored. When the hydrocarbon streams are used as intermediates in chemical processes they may cause deactivation of the catalysts used in such processes. When the hydrocarbon streams are used as fuels, the sulfur compounds react to produce sulfur oxides, and eventually other sulfur compounds, which remain present in the combustion gasses that are released into the atmosphere. Those compounds are subject to severe restrictions regarding their release into the environment. Such motives justify the treatment of liquid and gaseous hydrocarbon streams for removal of sulfur compounds contained therein down to concentration levels that might be deemed acceptable.

It is well known that certain products formulated with metal oxides and hydroxides may be used to remove sulfur compounds from liquid or gaseous streams. The cited metal oxides have the generic formula $M_xO_y$, and the metal hydroxides have the generic formula $M_xO_y(OH)_z$, wherein M represents a metal. The main constituent metals of those oxides are zinc and iron or mixtures thereof. Other metals such as copper, nickel, cobalt, molybdenum and manganese may also be present, however their main function is to increment the rate of absorption of impurities by the main metals. The end products based on such oxides and hydroxides may be presented as powders, that are used in the form of slurries in mixture with the stream to be treated, or in the form of granules that are accommodated on fixed beds through which passes the stream of fluid to be treated. The granules may be supported, when the metal oxides and/or hydroxides are deposited on inert solids, or the granules may be massive when constituted only by the metal oxides and/or hydroxides and their additives.

Upon exhausting their useful capacity, the absorbents used in the form of granules are removed from the equipment units in which they were used, and are substituted with new charges to continue the process. For this reason, there are used multiple absorption equipment units, arranged in parallel, such that it is always possible to interrupt the operation of one of them in order to replace the absorbent without interrupting the fluid treatment operation as a whole.

It will always be desirable that the exhausted absorbent might be recovered and reprocessed in order to avoid the generation of solid residue that might face serious restrictions for disposal into the environment. It is further desirable that the absorbent have a high capacity to absorb impurities in order to extend its practical utilization, both in terms of operating intervals and in relation to weight of absorbent used per unit weight of impurity removed. A higher absorption capacity affords a longer operating time and a lesser number of replacement operations with less incidence of the cost of removal of the same amounts of impurities.

For the treatment of gaseous streams at relatively high temperatures (above 100° C.), one of the most used products is mainly formulated with zinc oxide (ZnO). The elimination of $H_2S$ involves the following chemical reaction:

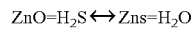

In operating conditions, the water that is produced is vaporized, transforming itself into a gas, which is incorporated to the gaseous stream that is being treated.

The zinc oxide based absorbents are almost always massive, where the zinc oxide is used together with a binder to maintain the physical integrity of the final product.

At relatively low temperatures, operating with water-saturated gas streams, the products formulated based on zinc oxide are generally not preferred due to their low absorption rate and the possibility of physical disintegration of the product granules, which may cause excessively increase the pressure drop across the absorbent bed prior to its chemical saturation.

The activated carbon has been used for absorption of $H_2S$ from streams of natural gas and other gasses, due to its large specific area. However, it has a low $H_2S$ retention capacity, operating at low temperatures. For that motive, the use of activated carbon in applications of that nature has been quite limited. The use of activated carbon is more common for removal of undesirable odors (including that of $H_2S$) in gasses that are directly released into the atmosphere.

For operation at relatively low temperatures and with streams saturated with water vapor/steam, the generally preferred absorbents are those based on iron oxide in the form of crystalline magnetite ($Fe_3O_4$), that may also contain iron hydroxides (FeO(OH)). Thus, such as in the ease of absorbents based on zinc oxide, the removal of $H_2S$ also occurs by way of a chemical reaction, involving the reduction of iron of valence 3 to valence 2:

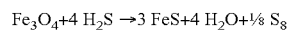

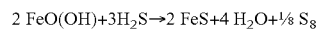

It is also possible, as well as desirable, that a reducing dissolution occur, such as shown in the equation below:

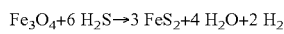
$$Fe_3O_4 + 6\ H_2S \rightarrow 3\ FeS_2 + 4\ H_2O + 2\ H_2$$

The hydrogen may participate in the reaction of absorption of the H$_2$S with the formation of FeS:

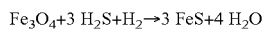
$$Fe_3O_4 + 3\ H_2S + H_2 \rightarrow 3\ FeS + 4\ H_2O$$

Some additives may accelerate the rate of absorption of impurities contained in the streams treated with absorbents based on iron oxide and hydroxide. Examples of such additives include copper oxides (cupric or cuprous copper), as proposed by Dalbert Scranton in patent application No. WO 98/07501, published in Feb. 26, 1998.

The first absorbents based on iron oxides were prepared using inert solid supports whereon the oxides were deposited. One of the inert solid supports was made of wood pieces impregnated with iron oxide. Absorbents of that type were in commercial use for a long time, however they entail serious disadvantages. Some of the disadvantages consist in a low capacity to absorb impurities, per unit volume of absorbent, and the tendency to excessive packing/caking of the bed, which may be caused by retention of water, leading to an increasing head loss to very high levels that require the substitution thereof. One other problem resides in the difficulty to recover and recycle the exhausted product in a practical and cost-effective manner.

Various materials were proposed as substitutes for the wood as support for the metal oxides and hydroxides. One of these is amorphous iron (III) oxide (Fe$_2$O$_3$), as proposed, for example, by Irwin Fox et al in U.S. Pat. No. 4,366,131. In turn, Jerome Gross, in patent application No. WO 91/03422, page 4, proposes the use of calcined montmorillonite as support for iron oxide based absorbents. A formulation that is preferred by Jerome Gross indicates a proportion of 59% montmorillonite, 22% iron oxide, 18% water and 1% sodium sulfite. In one of the tests having been conducted, that product evidenced a content of 288 kg/m$^3$ of iron oxide per m$^3$ of bed (18 lbs. of iron oxide per cubic foot of bed).

The supported absorbents exhibit an inherent deficiency consisting in the presence of inert material (support), when it is desired to maximize the amount of reactive iron oxide and hydroxide per unit volume. The inert material takes space without contributing to retain the impurities from the treated stream. On the other hand, massive absorbents may allow the accommodation of much higher amounts of reactive iron oxides and/or hydroxides per unit volume Extruded massive absorbents based on iron oxides useful for the removal of sulfur compounds from process streams were already indicated for commercial use in the book "Catalyst Handbook", edited by *Wolfe Scientific Books*, London, 1970.

One of the main difficulties entailed by the use of massive absorbents of iron oxide, particularly of magnetite, resides in the difficulty in maintaining the integrity of the shape of the final product during the preparation thereof and handling prior to its use and particularly upon the same being exhausted, when the magnetite transforms into the iron sulfides. Several factors are associated with the maintenance of integrity of the particles during use and unloading. The designed material may not stay aggregated in the presence of water, which is commonly entrained in some gaseous streams, and which may cause compacting of the bed. Furthermore, the higher is the conversion of the oxides to sulfides, the higher will be the probability of disintegration of the granules. The disintegration of the granules during the use of the product may lead to the formation of fine particles that lodge in the void spaces in the absorbent bed, thereby increasing resistance to passage of the fluid (increased head loss), where it may be necessary to stop and substitute the absorbent even before the same reaches chemical saturation. Thus, even with high contents of metal oxides, there might not be achieved a higher capacity of removal of sulfur compounds. The disintegration of the material may also entail the release of powder during the handling and unloading of the exhausted charge, which constitutes a serious disadvantage from the perspective of industrial hygiene. In addition, the formation of powder represents a loss of product to the environment, which might represent a serious pollution problem.

The preparation of granulated materials by compaction or extrusion almost always requires the use of at least one binder capable of keeping together the particles of the metal oxides and hydroxides. The binders may be inorganic compounds or organic compounds. Examples of inorganic binders include bentonite, kaolin, cement and alumina. Materials of this type are described, for example, by Gyanesh P. Khare, in patent U.S. Pat. No. 5,306,685. Mr. Khare used those materials to prepare extruded absorbents constituted by mixtures of zinc oxide and iron oxide (Fe$_2$O$_3$). Examples of organic binders may include starch paste, sugar (sucrose), glucose, gelatin and others, cited generically in PERRY's Chem. Eng. Handbook, 6$^{th}$ Edition (1984). Polyethylene glycol (PEG) and poly (vinyl alcohol) are cited by Koichi Kitahara et as in U.S. Pat. No. 5,670,445. In addition to these authors, Mahesh C. ha et al, in U.S. Pat. No. 4,732,888, indicate the use of starch, in addition to methylcellulose and corn syrup, for producing absorbent tablets containing iron and zinc oxides.

For extruded absorbents, it is necessary to prepare a paste having sufficient plasticity to allow the same to flow through an extruder, The addition of water in adequate proportions may produce a paste with the desired properties for extrusion. An excessive amount of water may produce an extrudate with mechanical strength that is too low for handling during the subsequent operations (cutting, transport and drying), A low amount of water may leave the paste without fluidity and very abrasive to the point of rendering the extrusion operation unfeasible. The addition of water to obtain a mass of iron oxide with adequate properties for extrusion is described by Paul R. Pine et al, in U.S. Pat. No. 2,457,719, and in U.S. Pat. No. 2,461,147, E. P. Daves et al also describe the addition of water to iron oxides for obtaining pastes with sufficient plasticity for extrusion. These authors also indicate the use of other extrusion adjuvants, such as stearic acid, hydrogenated vegetable oil and tannic acid.

SUMMARY OF THE INVENTION

The present invention describes the preparation of an absorbent composition, also called an absorbent, and the use thereof in processes of removal of impurities, particularly sulfur compounds, from liquid and gaseous streams. It has been observed that the addition of carbon surprisingly brings much improvement to the capacity of absorbing impurities and the resistance to disintegration of massive absorbents based on iron oxide and/or hydroxide. That effect is observed when the carbon, and particularly activated carbon, is added such that the carbon content in the final product is between 0.5% and 50% by weight, and preferably between 3% and 20% by weight.

The exact mechanism of action of the carbon during the absorption is not entirely clarified. However, the unexpected and improved results noted in the present invention may be due to the fact that the carbon, by causing an increase in the surface area of the final product, might possibly allow a greater amount of active metal to be exposed and more easily available for reacting with the impurities found in the streams that are being treated. It is also possible that the carbon itself cooperates in the absorption of some undesired compounds that do not normally react with the active metal.

The presence of carbon also improves the physical characteristics of the granules, both those recently prepared and the ones exhausted upon saturation with the impurities having been absorbed thereby. This improvement is quite important since it reduces the losses of material during unloading, reducing the formation of dust, and consequently improving the work conditions, as well as mitigating the losses to the environment of products containing sulfur (exhausted absorbent). The exhausted granules can thus be removed from the vessels wherein they are used, can be packed in adequate packages and sent to reprocessing or co-processing. One of the forms of co-processing consists in mixing the exhausted granules in natural pyrites used in ustulation processes (reaction with air at high temperature) for the production of iron oxides used in the production of pig iron and sulfur dioxide. The sulfur dioxide is used for the production of sulfuric acid.

One of the preferred forms of adding carbon is to mix it with a mass of synthetic iron oxides and/or hydroxides, binders, other optional organic and inorganic additives and water, depending on the process used for designing the tablets. The mixture of those materials may be made with the use of a common solids mixer, and thereafter subjecting the final paste to a conformation process in order to obtain the desired granules. If the mixture is subjected to a tableting process, the addition of water may not be necessary. in order to obtain tablets by the process of mechanical compression it may be necessary to add a lubricant, typically graphite or the very carbon constituent of the composition, in order to facilitate the release of the tablets from the molds in which the same are compressed to obtain the final absorbent. The preferred size of the tablets is from 2 nun to 10 mm in diameter, and preferably from 3 mm to 10 mm in height. In order to obtain extruded granules it is necessary to add water in the proportion of 5% to 30%, and preferably from 15% to 255, by weight, to the paste in order to obtain sufficient plasticity to feed the extruder machine. The extrudates are cut into granules of I to 9 mm in diameter and 3 to 25 mm in length, and preferably from 5 mm to 15 mm in length. The material thus obtained is then dried at a temperature of less than 130° C. until there is obtained a product with 0,5 to 8%, by weight, of water, in order to achieve maximum mechanical strength.

The addition of carbon is equally efficient, irrespective of the form of preparation of the granules of the absorbent composition, either by tableting or by extrusion.

The conformed absorbent composition, or absorbent, according to the present invention, intended for the removal of contaminants, and particularly of sulfur compounds contained in liquid and gaseous streams, comprises the following ingredients:

(i) iron oxide and/or hydroxide,
(ii) from 0% to 15%, by weight, based on the weight of the final composition, of a binder, and preferably from 0.5% to 15%, by weight,
(iii) from 0% to 5%, by weight, based on the weight of the final composition, of a lubricant, and preferably from 0.5% to 5%, by weight,
(iv) water, and
(v) from 0% to 5%, by weight, based on the weight of the final composition, of promoting additives, and preferably from 0.1% to 5%, by weight, and is characterized by further comprising:
(vi) from 0,5% to 50%, by weight, based on the weight of the final composition, of carbon, with the composition evidencing a specific area relationship between the carbon and the iron oxide and/or hydroxide that varies from 2.5 to 600, and has a mechanical strength in excess of 9.81 N (1 kgf), maintaining its physical integrity prior to and after saturation by impurities.

The composition according to the present invention comprises, preferably, from 3% to 20%, by weight, based on the weight of the final composition, of carbon.

The carbon can be charcoal or mineral coal or may consist in mixtures thereof, and is more preferably charcoal. The most preferred carbon for the realization of the present invention is active carbon.

For the preparation of the absorbent composition according to the present invention, the carbon may have a grain size between screen mesh sizes 60 and 325 according to the Tyler System and a specific area of 100 to 1200 $m^2/g$.

The preferred iron oxide for preparing the absorbent composition that constitutes the object of the present invention is synthetic magnetite. There are several ways of preparing such synthetic magnetite. One of these consists in the precipitation of $Fe(OH)_2$ from a solution of ferrous sulfate. The iron (II) hydroxide is then heated under controlled conditions, in the presence of air, in order to obtain crystalline magnetite. This is the preferred route used for commercial production of the magnetite used as Black Pigment in the production of paints. One other form of obtaining the crystalline magnetite is by thermal decomposition of an iron (III) carboxylic acid basic salt, iron (III) hydroxyacetate, for example, in an inert gas atmosphere. In any case, the synthetic magnetite used to prepare the absorbent that constitutes the object of the instant invention always produces equivalent results.

The preferred iron hydroxide for preparing the absorbent that constitutes the object of the present invention may be obtained by precipitation of an iron (II) salt in the presence of air. The iron hydroxide deemed adequate for use in connection with the present invention is FeO(OH) or similar.

In the composition in accordance with the present invention, the iron oxide and/or hydroxide has a specific area varying from 2 to 40 $m^2/g$.

The binder is selected from among cement, alumina, silica, montmorillonite, bentonite, vegetable oil, stearates, polyglycol, sucrose, starch, cellulose, hydroxyethyl cellulose, carboxyethyl cellulose, or mixtures of those substances.

The lubricant is selected from among graphite and stearate or mixtures of those substances.

The water, added in the present composition is present in a proportion varying from 0.1% to 30%, by weight, based on the weight of the final composition.

The promoter additive is a transition metal oxide, and it is preferably selected from among copper (I) oxide, copper (II) oxide, nickel oxide, cobalt oxide or mixtures thereof.

Preferably, the absorbent composition is in the form of a granulated solid with a diameter in excess of 1.0 mm.

One other object of the present invention consists in the provision of a method for the obtainment of the designed absorbent composition, as defined above, such method comprising the following steps:

a) preparation of a mixture of the iron oxide and/or hydroxide with at least one binder, and carbon, and optionally, a promoter additive,
b) homogenization of the mixture formed in a) in a solids mixer with moisture control with additional water of at most 30%, by weight, based on the weight of the final composition,
c) extrusion for obtainment of granules with a diameter between 1.0 mm and 9.0 mm and a length of from 3 mm to 25 mm, d) drying of the extruded material at a temperature below 130° C., and e) sieving to separate the fines eventually formed, In an alternative form of realization of the present invention, there is provided a method for obtainment of the designed absorbent composition, as defined above, such method comprising the following steps:

a) preparation of a mixture of the iron oxide and/or hydroxide with at least one binder and/or lubricant, carbon, and optionally, a promoter additive and water, b) dry homogenization of the mixture formed in a) in a solids mixer, c) pelletizing for obtainment of cylindrical granules with a diameter between 2 mm and 10 mm and a length of from 3 mm to 10 mm, and d) sieving to separate the fines eventually formed.

The present invention also relates to a method for the removal of impurities, predominantly sulfur compounds, including hydrogen sulfide, contained in liquid and gaseous streams, the said method comprising the following steps:

a) loading the absorbent composition, as defined above, onto a bed or a group of beds arranged in series or in parallel, or in combinations of arrangements in series and in parallel, b) absorption of contaminants by means of the passage of liquid or gaseous streams containing the said contaminants, in upward or downward flow, across the said bed during a sufficient period of time for the bed to be saturated with the said contaminants, such saturation being defined by the specification of impurities in the outflowing stream, and c) removal of the saturated absorbent composition, which is substituted with another charge of absorbent composition equivalent to the initial charge, such replacement being successively repeated.

In step b) of the process of removal of impurities according to the present invention, the operation is carried out at an absorption temperature in excess of 5° C. and of less than 125° C. and at a pressure equal to or above atmospheric pressure.

The gaseous stream to be treated may consist in natural gas or gas associated to the production of petroleum, and this stream may further contain water up to its saturation concentration.

The liquid stream to be treated may be preferentially liquefied petroleum gas (LPG).

The absorbent composition retains impurities from the streams to be treated up to an amount equivalent to at least 360 kg of sulfur per m of the absorbent composition, maintaining the content of impurities in the outflowing stream below the specified level.

The exhausted absorbent composition may be removed from the bed whereon it was used, without significant loss of material in the form of powder or very small particles, and thereby it can be reprocessed or co-processed for recovery of iron and sulfur in the form of useful substances.

The instant patent application also refers to the use of the absorbent composition for removal of impurities present in fluids such as natural gas, refinery gas, biogases and other liquid or gaseous fluids, containing hydrocarbons contaminated by sulfur-based compounds.

There were prepared and compared absorbent compositions designed in accordance with the present invention and in accordance with the prior art, and such compositions will hereinafter be designated as absorbents.

Example 1

Preparation of Magnetite:

A quantity of 25 mol of $Fe(NO_3)_3.9H_2O$ was dissolved in distilled water and the volume was subsequently completed to 25 liters. To this solution there was added, under stirring, 12.5 liters of a solution of ammonium hydroxide at 25%, by weight, at ambient temperature. The addition of the ammonium hydroxide solution was conducted slowly in the beginning (10% of the volume) and was subsequently faster. There was obtained a brown gelatinous precipitate. There were subsequently added 10 liters of water to reduce the viscosity of the medium. After vigorous stirring for 15 minutes, the suspension was centrifuged at 2000 rpm for 5 minutes. The supernatant liquid was discarded. The gel was washed with a solution of ammonium acetate at a concentration of 2% and was subsequently once again centrifuged at 2000 rpm, for 5 minutes. The washing and centrifugation process was repeated an additional six times until there was obtained a mass of iron (III) hydroxyacetate. That material was then dried in an oven at a temperature between 90° C. and 110° C., during 3 hours, in a nitrogen atmosphere, whereupon there was obtained 2.7 kg of intermediate product. That material was thereafter ground in a roll mill and the resulting material was sieved using a #200 mesh screen (per the Tyler System) to separate the fines. The selected product was calcined at 320° C. in an oven, wherein there was maintained a nitrogen atmosphere throughout the entire process, including the final cooling step until reaching ambient temperature. There were obtained approximately 2.0 kg of magnetite with a surface area of approximately $30 m^2/g$.

Preparation of Absorbent 1:

A quantity of 1.0 kg of magnetite prepared as described above was mixed with 100 g of pulverized activated carbon, 40 g of starch and the water required to obtain an extrudable paste. That paste was then fed to an extruder provided with drawing means with holes of 3.2 MM (⅛") in diameter, whereby were obtained extrudates that were immediately cut to provide cylinders with 10 mm to 15 mm in length. The material thus obtained was subjected to a drying process in an oven at a temperature of about 110° C., for 10 hours. After drying, the material was sieved to separate the fines formed during the drying process. The material having been obtained was identified as absorbent 1.

For purposes of comparison there was prepared an absorbent similar to absorbent 1, however without the addition of active carbon: 1.0 kg of magnetite prepared as described above was mixed with 100 g of starch and the water required to obtain an extrudable paste. That paste was fed to an extruder whereby was obtained an extruded material with a diameter of 3.2 mm (⅛"). Those extrudates were immediately cut to provide the same in the form of cylinders with lengths of 10 to 15 mm. The material was then subjected to a drying process in an oven, at a temperature of about 110° C., for 10 hours. When dry, the material was sieved to separate the fines formed during the drying process. The material thus obtained was identified as absorbent Absorbents 1 and 2 exhibited the properties shown in Table 1:

TABLE 1

| Property | Absorbent 1 | Absorbent 2 |
|---|---|---|
| Iron oxide (% by weight) | 90 | 98 |
| Bulk density (kg/m$^3$) | 900 | 1000 |
| Surface area (m$^2$/g) | 120 | 30 |
| Porosity (mL/g) | >0.40 | 0.30 |
| Mechanical strength (N) (kgf) | >58.84 (>6) | >58.84 (6) |

Performance Test:

Absorbents 1 and 2 prepared as described above were subjected to performance tests in a tubular reactor with a nominal diameter of 2.54 cm (1"), within which there was accommodated a sample of 100 mL. The reactor was fed with nitrogen saturated with water vapor (steam) and containing 50 vpm (volumes per million) of $H_2S$. The temperature was maintained at 40° C., at a pressure of 5884 kPa (60 kgf/cm$^2$) absolute and a space velocity of 450 h$^{-1}$. The effluent exhibited a content of $H_2S$ of less than 0.02 vpm, with those conditions being maintained for a certain time. In order to evaluate the capacity of the absorbent, the $H_2S$ content in the feed was raised to 1.0% in volume and the space velocity was increased to 1000 h$^{-1}$, and those conditions were maintained until the concentration of $H_2S$ in the reactor effluent exhibited a value of approximately 80% of the value on intake. After that point the feed was once again altered, passing to a concentration of 50 vpm of $H_2S$, and the space velocity was reduced to 450 h$^{-1}$. Those conditions were maintained until the concentration of $H_2S$ in the affluent exhibited a value above 0.02 vpm, defined as the "break through" value.

The test of absorbent 2 had to be interrupted before reaching the "break through" value, when the loss of charge in the bed started to exhibit excessively high values.

Assessment of the results:

The evaluation of the absorbents was conducted by determining the absorbed amount of sulfur by unit volume of the bed. The calculations were made by mass balance of the gas (chromatographic analysis on intake and on outflow) and by the variation in weight of the sample used The average values of total absorption of sulfur of absorbents 1 and 2 were respectively 462 kg and 320 kg of sulfur per m$^3$ of bed. The value obtained for absorbent 1 was much superior to that which is found in prior art documents relative to absorbents used in similar conditions.

Upon conclusion of the tests, the reactors were opened. Absorbent 1 was able to be easily unloaded since it maintained mechanical characteristics that were similar to those of the unused material. Its mechanical strength was determined and there was obtained a value of 88.26 N (9 kgf). On the other hand, absorbent 2, which was prepared without active carbon, was compacted on the bed, requiring the use of water jets for removal thereof. There was thus obtained a suspension of disaggregated material in water, rendering it impossible to measure its mechanical strength using standard methods.

The exhausted absorbent 1 exhibited a chemical composition with a prevalence of $FeS_2$ and approximately 10% carbon.

This example demonstrates that the incorporation of active carbon not only increases the absorbents sulfur absorption capacity but also allows the same to maintain its physical integrity, facilitating the unloading of the spent material and rendering feasible the reprocessing thereof for obtainment of useful products.

Example 2

Preparation of the Absorbent:

A quantity of 50 kg of commercial synthetic magnetite (Black Pigment II) was mixed with 12 kg of pulverized active carbon, 2 kg of starch and 16 kg of water, using a solids mixer until obtaining a paste with sufficient plasticity for injection in an extruder, there being obtained thereby an extruded material with a diameter of 3.2 mm. Those extrudates were immediately cut to provide cylinders with 10 mm to 15 mm in length. The said material was subjected to a drying process in an oven at a temperature of about 110° C., for 10 hours. Upon drying, the material was sieved to separate the fines formed during the drying process. The selected material was separated and identified as absorbent 3.

For purposes of comparison, there was prepared an absorbent similar to absorbent 3, however without the addition of active carbon: 50 kg of commercial synthetic magnetite (Black Pigment II) were mixed with 2 kg of starch and 10 kg of water using a solids mixer until there was obtained a paste with sufficient plasticity for injection in an extruder, whereby was obtained a material with a diameter of 3.2 mm. Those extrudates were immediately cut for provision thereof in the form of cylinders with 10 mm to 15 mm in length. The material was then subjected to a drying process in an oven at a temperature of about 110° C., for 10 hours. Upon drying, the material was sieved to separate the fines formed during the drying process. The selected material was separated and identified as absorbent 4. Absorbents 3 and 4 exhibited the properties shown in Table 2:

TABLE 2

| Property | Absorbent 3 | Absorbent 4 |
| --- | --- | --- |
| Iron oxide (% by weight) | 78 | 96 |
| Bulk density (kg/m$^3$) | 900 | 1300 |
| Surface area (m$^2$/g) | 135 | 8 |
| Porosity (mL/g) | 0.55 | 0.20 |
| Mechanical strength (N) (kgf) | >58.84 (>6) | >58.84 (>6) |

Performance Test:

The procedure used for the performance test of absorbent 3 was the same used for absorbents 1 and 2, as per the description given in Example 1 above.

The evaluation of the absorbents was conducted by determining the absorbed amount of sulfur by unit volume of the bed. The calculations were made by mass balance of the gas (chromatographic analysis on intake and on outflow) and by the variation in weight of the sample used. The average value of total absorption was 460 kg of sulfur per m$^3$ of bed for absorbent 3, and 350 kg of sulfur per m$^3$ of bed for absorbent 4.

The test of absorbent 4 had to be interrupted before reaching the "break through" value, when the loss of charge in the bed started to exhibit excessively high values.

Upon absorbent 3 having exhausted its capacity, the reactor was opened and absorbent 3 could be easily unloaded since it maintained mechanical characteristics that were similar to those of the unused material Its mechanical strength was determined and there was obtained a value of 88.26 N (9 kgf). On the other hand, absorbent 4, which was prepared without active carbon, was compacted on the bed, requiring the use of water jets for removal thereof. There was thus obtained a suspension of disaggregated material in water, rendering it impossible to measure its mechanical strength using standard methods.

Example 3

Preparation of the Absorbent:

A quantity of 25 kg of commercial synthetic magnetite (Black Pigment II) and 25 kg of iron hydroxide (Yellow Pigment 42) was mixed with 5 kg of pulverized active carbon, 2 kg of hydroxyethyl cellulose (HEC) and 16 kg of water, using a solids mixer until obtaining a paste with sufficient plasticity for injection in an extruder, there being obtained thereby an extruded material with a diameter of 3.2 mm.

Those extrudates were immediately cut to provide cylinders with 10 to 15 mm in length. That material was subjected to a drying process in an oven at a temperature of about 110° C., for 10 hours. Upon drying, the material was sieved to separate the fines formed during the drying process. The said material was identified as absorbent 5.

A quantity of 25 kg of commercial synthetic magnetite (Black Pigment II) and 25 kg of iron hydroxide (Yellow Pigment 42) was mixed with 5 kg of pulverized active carbon, 0.25 kg of copper (II) oxide, 2 kg of hydroxyethyl cellulose (HEC) and 16 kg of water, using a solids mixer until obtaining a paste with sufficient plasticity for injection in an extruder, there being obtained thereby an extruded material with a diameter of 3.2 mm. Those extrudates were immediately cut for provision thereof in the form of cylinders with 10 to 15 mm in length. That material was subjected to a drying process in an over at a temperature of about 110° C., for 10 hours. Upon drying, the material was sieved to separate the fines formed during the drying process. The said material was identified as absorbent 6.

The materials having been obtained exhibited the properties shown in Table 4.

TABLE 4

| Property | Absorbent 5 | Absorbent 6 |
|---|---|---|
| Iron oxide (wt % wt) | 89 | 89 |
| Bulk density (kg/m$^3$) | 960 | 960 |
| Surface area (m$^2$/g) | 95 | 94 |
| Porosity (mL/g) | 0.30 | 0.30 |
| Mechanical strength (N) (kgf) | >78.45 (>8) | >78.45 (>8) |

Assessment of the Results

The evaluation of the absorbents was conducted by determining the absorbed amount of sulfur by unit volume of the bed. The calculations were made by mass balance of the gas (chromatographic analysis on intake and on outflow) and by the variation in weight of the sample used. The results were, respectively, 452 kg and 460 kg of sulfur per m$^3$ of bed, for absorbents 5 and 6. These values are much superior to those observed in prior art documents relative to absorbents used in similar conditions.

The exhausted material unloaded from the reactor was evaluated as to its mechanical strength. The absorbents were unloaded, exactly as loaded, and their mechanical strength values upon unloading were higher than 88,26 N (9 kgf).

There was conducted another test with absorbent 5, using a gas composed by 40% carbon dioxide and 60% nitrogen (dry base) saturated with water. The operating conditions were equal to those used in the previous examples. Absorbent 5 exhibited an absorption value of 452 kg S/m$^3$.

Example 4

Absorbent 3, prepared as described in Example 2, was used in the treatment of an LPG stream. Absorbent 3 was subjected to a performance test in a tubular reactor with a nominal diameter of 2.54 cm (1"), within which there was placed a sample of 45 L. The reactor was fed with liquid LPG with liquid space velocity equal to 1,56 h$^{-1}$. The temperature was maintained at 32° C., the pressure was maintained at 1275 kPa (13 kgf/cm$^2$) absolute. The effluent was analyzed according to the method provided in standard ASTM D 1838 to determine corrosiveness, a specification item for liquefied petroleum gas, and the same was found to be according to specification.

The invention claimed is:

1. An absorbent composition designed for the removal of contaminants comprising sulfur compounds, contained in liquid and gaseous streams, comprised of iron oxide and/or hydroxide, a binder and/or a lubricant, water, and optionally promoter additives, characterized by containing carbon in a proportion of from 0.5% to 50% by weight, based on the weight of the final composition, wherein the same exhibits a specific area relationship between the carbon and the iron oxide and/or hydroxide of between 2.5 and 600, having a mechanical strength value higher than 9.81 N (1 kgf), maintaining the physical integrity thereof prior to and after becoming saturated with impurities.

2. A composition, as claimed in claim 1, characterized by containing carbon in a proportion of between 3% and 20% by weight, based on the weight of the final composition.

3. A composition, as claimed in claim 1, characterized in that the carbon exhibits a grain size between screen mesh values 60 and 325 of the Tyler System for the preparation of the absorbent composition.

4. A composition, as claimed in claim 1, characterized in that the carbon consists in vegetable charcoal, or mineral coal or mixtures thereof.

5. A composition, as claimed in claim 4, characterized in that the carbon consists in vegetable charcoal.

6. A composition, as claimed in claim 4, characterized in that the vegetable charcoal is active carbon.

7. A composition, as claimed in claim 1, characterized in that the iron oxide consists in synthetic magnetite.

8. A composition, as claimed in claim 1, characterized in that the iron hydroxide consists in FeO(OH).

9. A composition, as claimed in claim 1, characterized in that the specific area of the carbon is from 100 to 1200 m$^2$/g.

10. A composition, as claimed in claim 1, characterized in that the specific area of the iron oxide and/or hydroxide is from 2 to 40 m$^2$/g.

11. A composition, as claimed in claim 1, characterized in that the binder is selected from among cement, alumina, silica, montmorillonite, bentonite, vegetable oil, stearates, polyglycol, sucrose, starch, cellulose, hydroxyethyl cellulose, carboxyethyl cellulose, or mixtures of those substances, in the proportion of 0.5% to 15% by weight, based on the weight of the final composition.

12. A composition, as claimed in claim 1, characterized in that the lubricant is selected from among graphite and stearate or mixtures of those substances, in the proportion of 0.5 to 15% by weight, based on the weight of the final composition.

13. A composition, as claimed in claim 1, characterized in that the water is present in the proportion of 0.1% by weight to 30% by weight based on the weight of the final composition.

14. A composition, as claimed in claim 1, characterized in that the promoter additive is a transition metal oxide.

15. A composition, as claimed in claim 14, characterized in that the promoter additive is copper (I) oxide, copper (II) oxide, nickel oxide, manganese oxide, cobalt oxide or mixtures thereof, in the proportion of 0.1% to 5% by weight, based on the weight of the final composition.

16. A composition, as claimed in claim 1, characterized in that it is in the form of a granular solid with a diameter larger of more than 1.0 mm.

17. A method for obtaining a designed absorbent composition, as defined in accordance with claim 1, the said method being characterized in that it comprises the following steps:
   a) preparation of a mixture of the iron oxide and/or hydroxide with at least one binder, and carbon, and optionally, a promoter additive, b) homogenization of the mixture formed in a) in a solids mixer with moisture control with additional water of at most 30%, by weight, based on the weight of the final composition, c) extrusion for obtainment of granules with a diameter between 1.0 mm and 9.0 mm and a length of from 3 mm to 25 mm, d) drying of the extruded material at a temperature below 130° C., and e) sieving to separate the fines eventually formed.

18. A method for obtaining a designed absorbent composition, as defined in accordance with claim 1, the said method being characterized in that it comprises the following steps:

a) preparation of a mixture of the iron oxide and/or hydroxide with at least one binder and/or lubricant, carbon, and optionally, a promoter additive and water, b) dry homogenization of the mixture formed in a) in a solids mixer, c) pelletizing for obtainment of cylindrical granules with a diameter between 2 mm and 10 mm and a length of from 3 mm to 10 mm, and d) sieving to separate the fines eventually formed.

19. A method for the removal of impurities, comprising sulfur compounds, including hydrogen sulfide, contained in liquid or gaseous streams, the said method being characterized in that it comprises the following steps:

a) loading of the absorbent composition, as defined in claim 1, on a bed or a group of beds arranged in series or in parallel, or provided in combinations of arrangements in series and in parallel, b) absorption of contaminants by means of the passage of liquid or gaseous streams containing the said contaminants, in upward or downward flow, across the said bed during a sufficient period of time for the bed to become saturated with the said contaminants, such saturation being defined by the specification of impurities in the outflowing stream, and c) removal of the saturated absorbent composition, which is substituted with another charge of absorbent composition equivalent to the initial charge, such replacement being successively repeated.

20. A method, as claimed in claim 19, characterized in that the absorption temperature in step b) is higher than 5° C. and lower than 125° C. and the pressure is equal to or higher than atmospheric pressure.

21. A method, as claimed in claim 19, characterized in that the said gaseous stream consists in natural gas or gas associated to the production of petroleum, where this stream may contain water up to the saturation concentration thereof.

22. A method, as claimed in claim 19, characterized in that the said liquid stream consists in liquefied petroleum gas (LPG).

23. A method, as claimed in claim 19, characterized in that the absorbent composition retains impurities from the said streams up to an amount equivalent to at least 360 kg of sulfur per $m^3$ of the absorbent composition, without loss of physical integrity of the absorbent composition, maintaining the impurities content in the outflowing stream below the specified level.

24. A method, as claimed in claim 19, characterized in that the exhausted absorbent composition may be removed from the bed where it was used without much significant loss of material in the form of powder or very small particles, such that it may be reprocessed or co-processed for recovery of the iron and the sulfur in the form of useful substances.

* * * * *